(12) United States Patent
Okumoto et al.

(10) Patent No.: US 9,816,604 B2
(45) Date of Patent: Nov. 14, 2017

(54) SHIFTING DEVICE FOR VEHICLE

(71) Applicants: TOYOTA JIDOSHA KABUSHIKI KAISHA, Toyota-shi, Aichi-ken (JP); Kabushiki Kaisha Tokai Rika Denki Seisakusho, Niwa-gun, Aichi (JP); Tsuda Industries Co., Ltd., Kariya-shi, Aichi-ken (JP); Mannoh Industrial Co., Ltd., Anjo, Aichi (JP)

(72) Inventors: Ryuichi Okumoto, Nisshin (JP); Masaki Kobayashi, Komaki (JP); Yasunori Takeuchi, Chita-gun (JP); Naotaka Nishikawa, Anjo (JP); Makoto Yoshida, Takahama (JP)

(73) Assignees: TOYOTA JIDOSHA KABUSHIKI KAISHA, Toyota (JP); KABUSHIKI KAISHA TOKAI RIKA DENKI SEISAKUSHO, Aichi (JP); TSUDA INDUSTRIES CO., LTD., Kariya (JP); MANNOH INDUSTRIAL CO., LTD., Anjo (JP)

( * ) Notice: Subject to any disclaimer, the term of this patent is extended or adjusted under 35 U.S.C. 154(b) by 0 days.

(21) Appl. No.: 14/635,731

(22) Filed: Mar. 2, 2015

(65) Prior Publication Data

US 2015/0260275 A1 Sep. 17, 2015

(30) Foreign Application Priority Data

Mar. 14, 2014 (JP) .................................. 2014-052784

(51) Int. Cl.
*F16H 59/02* (2006.01)
*F16H 59/10* (2006.01)
*F16H 61/36* (2006.01)

(52) U.S. Cl.
CPC ..... *F16H 59/0213* (2013.01); *F16H 59/0278* (2013.01); *F16H 59/10* (2013.01);
(Continued)

(58) Field of Classification Search
CPC ............ F16H 59/0213; F16H 59/0278; F16H 2059/0269; F16H 2059/026; F16H 59/10;
(Continued)

(56) References Cited

U.S. PATENT DOCUMENTS 1,632,116 A * 6/1927 Buss ..................... E05D 7/1072
105/375
3,462,179 A * 8/1969 Hinkle .................. F16C 11/045
16/266

(Continued)

FOREIGN PATENT DOCUMENTS

EP 0038123 A2 * 10/1981 ............. B60K 20/02
JP H07-31454 U 6/1995
(Continued)

*Primary Examiner* — William Kelleher
*Assistant Examiner* — Joseph Brown
(74) *Attorney, Agent, or Firm* — Oliff PLC

(57) ABSTRACT

A shifting device for a vehicle includes a rotary operating member and a base member. The rotary operating member includes a rotary shaft. The base member has a bearing surface around a bearing hole. The rotary shaft is fitted in the bearing hole, and the bearing surface receives an outer circumferential surface of the rotary shaft. A pair of flat surfaces are provided on the outer circumferential surface of the rotary shaft. The pair of flat surfaces are configured such that one flat surface of the pair of flat surfaces is located between a pair of circumferential end edges of the bearing surface, within a predetermined rotating angle range of the rotary operating member.

8 Claims, 6 Drawing Sheets

(52) U.S. Cl.
CPC ........ *F16H 61/36* (2013.01); *F16H 2059/026* (2013.01); *F16H 2059/0269* (2013.01); *Y10T 74/20165* (2015.01)

(58) Field of Classification Search
CPC ......... F16H 59/0204; F16H 2059/0265; F16H 61/22; F16H 61/36; B60K 20/04; G05G 2009/04707; E05D 7/1066; E05D 7/1072
USPC ...... 74/473.3, 473.34; 403/4, 84, 91, 94, 99, 403/113, 116, 46, 165
See application file for complete search history.

(56) References Cited

U.S. PATENT DOCUMENTS

| | | | | |
|---|---|---|---|---|
| 5,522,279 | A * | 6/1996 | Kataumi | B60K 20/02 74/473.3 |
| 5,907,975 | A * | 6/1999 | Giaimo | F16H 59/04 403/115 |
| 6,301,994 | B1 * | 10/2001 | Syamoto | F16H 59/10 74/473.3 |
| 6,622,583 | B2 * | 9/2003 | Wang | F16H 59/02 74/473.18 |
| 7,900,534 | B2 * | 3/2011 | Kusayama | F16H 59/02 74/471 XY |
| 7,992,463 | B2 * | 8/2011 | Ueta | F16H 59/0204 74/473.18 |
| 2003/0213326 | A1 * | 11/2003 | Fett | F16H 59/04 74/473.3 |
| 2006/0060019 | A1 * | 3/2006 | Sato | F16H 59/10 74/473.23 |
| 2013/0145888 | A1 * | 6/2013 | Sasaki | F16H 59/0278 74/473.33 |
| 2014/0007729 | A1 * | 1/2014 | Fredriksson | F16H 59/0278 74/473.21 |
| 2014/0238172 | A1 | 8/2014 | Nakanishi et al. | |
| 2015/0107390 | A1 * | 4/2015 | Jeong | F16H 59/0278 74/473.3 |

FOREIGN PATENT DOCUMENTS

| | | | |
|---|---|---|---|
| JP | 2013071563 A | 4/2013 | |
| WO | WO 2005039914 A2 * | 5/2005 | ......... F16H 59/0204 |

* cited by examiner

SHIFTING DEVICE FOR VEHICLE

INCORPORATION BY REFERENCE

The disclosure of Japanese Patent Application No. 2014-052784 filed on Mar. 14, 2014 including the specification, drawings and abstract is incorporated herein by reference in its entirety.

BACKGROUND OF THE INVENTION

1. Field of the Invention

The invention relates to a shifting device for a vehicle, and in particular to a technology for preventing foreign matters from getting caught, in a keyhole engagement structure for restricting rotation of a rotary operating member.

2. Description of Related Art

A shifting device for a vehicle has been proposed which includes a rotary operating member and a base member. The rotary operating member has a columnar rotary shaft that protrudes in a direction of one rotational axis and is adapted to be rotated within a predetermined rotating angle range about the rotational axis. The base member includes a support wall that is formed with a bearing hole having a bearing surface that receives the rotary shaft. One example of this type of vehicular shifting device is described in Japanese Patent Application Publication No. 2013-71563 (JP 2013-71563 A).

The bearing hole formed in the support wall may be formed in an elongated shape so as to provide a pair of guide walls that are opposed to each other at an interval that is smaller than the diameter of the rotary shaft of the rotary operating member, such that the guide walls are continuous with the partially cylindrical bearing surface, to provide a so-called keyhole engagement structure. The keyhole engagement structure may make it easy to mount the rotary operating member in the base member, and restrict or reduce the number of components.

SUMMARY OF THE INVENTION

FIG. 10 shows one example of the keyhole engagement structure provided in a vehicular shifting device 110. In the vehicular shifting device 110, a bearing hole 111 having a bearing surface 118 as a partially cylindrical, inner circumferential surface at its lower end is formed in a base member 116. A rotary shaft 114 that protrudes from a rotary operating member 112 is fitted in the bearing hole 111 and supported by the bearing surface 118. The bearing hole 111 has a pair of guide walls 122 that are opposed to each other at an interval that is smaller than the diameter of the rotary shaft 114, and the pair of guide walls 122 are formed so as to be continuous with the partially cylindrical, bearing surface 118. The rotary shaft 114 has a pair of flat surfaces 126a, 126b formed on an outer circumferential surface thereof and having an interval that is smaller than the interval of the pair of guide walls 122. The rotary shaft 114 is guided to the partially cylindrical bearing surface 118 with the pair of flat surfaces 126a, 126b formed on its outer circumferential surface sliding between the pair of guide walls 122, respectively, so that the rotary shaft 114 is mounted in the base member 116.

However, in the vehicular shifting device 110 as described above, when the rotary operating member 112 is operated in one of operating directions about the rotational axis, a clearance S is formed between one flat surface 126a of the pair of flat surfaces 126a, 126b provided on the outer circumferential surface of the rotary shaft 114 for mounting the rotary shaft 114 in the bearing hole 111, and the bearing surface 118, at an operating end of a rotating angle range of the rotary operating member 112. In this case, foreign matters may get caught in the clearance S.

The invention provide a shifting device for a vehicle, which prevents a clearance from being formed between a rotary shaft and a bearing hole, at an operating end of a rotating angle range of a rotary operating member, when the rotary operating member is operated to one of operating directions about a rotational axis.

A shifting device for a vehicle according to one aspect of the invention includes a rotary operating member and a base member. The rotary operating member includes a rotary shaft that extends in a direction of a rotational axis, and the rotary shaft has a columnar shape. The rotary operating member is adapted to be rotated within a predetermined rotating angle range about the rotational axis. The base member includes a support wall having a bearing hole, and a bearing surface is provided around the bearing hole. The bearing surface has a partially cylindrical shape. The rotary shaft is fitted in the bearing hole, and the bearing surface receives an outer circumferential surface of the rotary shaft. The support wall includes a pair of guide walls that are opposed to each other with at an interval that is smaller than a diameter of the rotary shaft, and the guide walls are provided so as to be continuous with the bearing surface. The guide walls define an elongated guide hole. A pair of flat surfaces are provided on the outer circumferential surface of the rotary shaft. An interval of the pair of flat surfaces is smaller than the interval of the pair of guide walls. The pair of flat surfaces are configured such that one flat surface of the pair of flat surfaces is located between a pair of circumferential end edges of the bearing surface, within the predetermined rotating angle range of the rotary operating member.

According to the vehicular shifting device as described above, the elongated guide hole has the pair of guide walls that are opposed to each other at an interval that is smaller than the diameter of the rotary shaft, and are continuous with the bearing surface. On the other hand, the rotary shaft has the pair of flat surfaces having a smaller interval than the interval of the guide walls. With the flat surfaces of the rotary shaft being opposed to the guide walls of the guide hole, respectively, the rotary shaft is fitted in the bearing surface, so that the rotary operating member is mounted in the base member. In the predetermined rotating angle range of the rotary operating member, one flat surface of the pair of flat surfaces is located between the pair of circumferential end edges of the partially cylindrical bearing surface. Therefore, no clearance is formed between the above-indicated one flat surface of the pair of flat surfaces and the bearing surface, within the predetermined rotating angle range of the rotary operating member. Thus, foreign matters are prevented from getting caught between the flat surface and the bearing surface.

In the shifting device as described above, the pair of flat surfaces provided on the outer circumferential surface of the rotary shaft may be parallel to each other, and the one flat surface of the pair of flat surfaces may be smaller than the other flat surface, while a distance between the one flat surface and the rotational axis may be larger than a distance between the other flat surface and the rotational axis. With this arrangement, the area of the outer circumferential surface of the rotary shaft which can slide on the bearing surface is increased; therefore, the predetermined rotating angle range of the rotary operating member, in which one flat surface of the pair of flat surfaces of the rotary shaft is located between the pair of circumferential end edges of the bearing surface, can be increased.

In the shifting device as described above, at least one of the guide walls may be provided with a pointed protrusion that protrudes in a circumferential direction of the bearing surface, from a corresponding one of a pair of opening ends of the bearing surface. With this arrangement, in the predetermined rotating angle range of the rotary operating member, foreign matters deposited on the outer circumferential surface of the rotary shaft which is not in sliding contact with the partially cylindrical bearing surface are peeled off by means of the pointed protrusion(s) formed so as to protrude in the circumferential direction of the bearing surface from at least one of the opposite opening ends of the bearing surface. Thus, the foreign matters are further prevented from getting caught between the outer circumferential surface of the rotary shaft and the opening ends of the bearing surface.

In the shifting device as described above, the pair of guide walls may include mutually parallel portions, and the rotational axis may be located closer to the other flat surface of the pair of flat surfaces than a center line between the guide walls. With this arrangement, the center line of the partially cylindrical bearing surface is brought into concentric relationship with the rotational axis of the rotary shaft at the same time that the rotary shaft guided by the pair of guide walls of the elongated guide hole is received by the bearing surface; therefore, the rotary shaft is able to rotate about the rotational axis immediately after the shaft is received by the bearing surface.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A shifting device for a vehicle according to one embodiment of the invention will be described in detail, with reference to the drawings.

Figure 1:
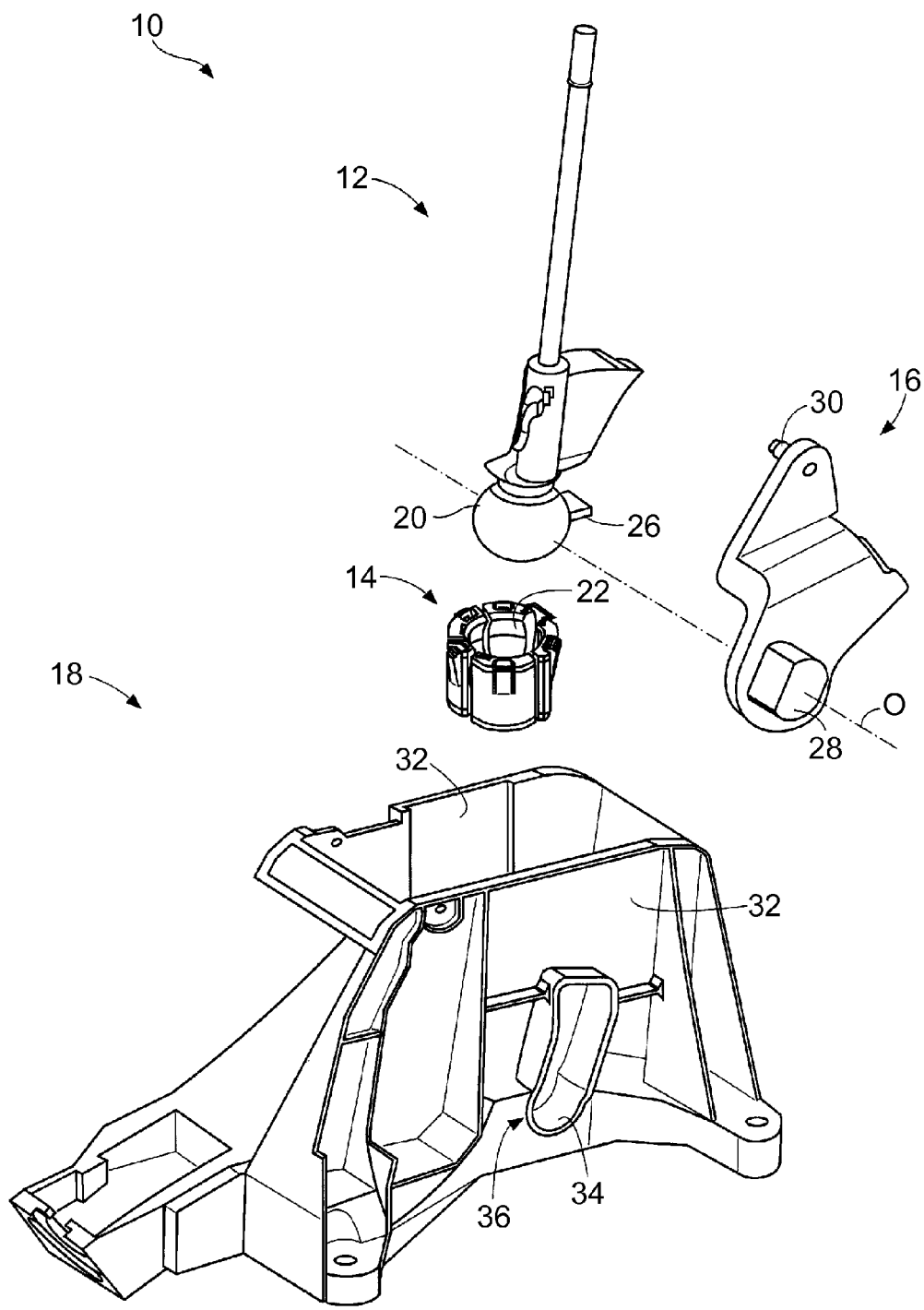
FIG. 1 is a perspective view showing a shift lever, a spherical proximal end portion, a bearing member, a control lever, and a base member, respectively, which constitute a shifting device for a vehicle according to one embodiment of the invention.

FIG. 1 is a perspective view showing a shift lever 12, a bearing member 14, a control lever 16, and a base member 18, separately, before assembling, which constitute a principal part of a shifting device 10 for a vehicle according to one embodiment of the invention. The vehicular shifting device 10 includes the shift lever 12, bearing member 14, control lever 16, and the base member 18. The shift lever 12 has a spherical proximal end portion 20 at its proximal end, and a knob (not shown) attached to a distal end portion thereof. The bearing member 14 receives a spherical proximal end portion 20. The bearing member 14 having a cylindrical shape has a spherical bearing surface 22 that can slidably contact with the spherical proximal end portion 20. The control lever 16 is mounted to the shift lever 12, and transmits operation of the shift lever 12 in a shift direction to an automatic transmission via a cable (not shown). The base member 18 houses the bearing member 14, and lower end portions of the shift lever 12 and the control lever 16, and is fixed to the floor of the vehicle compartment or cabin. The shift lever 12 is erected on the base member 18 such that it can pivot in shift directions and select directions, about the center of the spherical proximal end portion 20 that is slidably supported by the bearing member 14. The spherical proximal end portion 20 has a guide protrusion 26 in the form of a rectangular flat plate. The guide protrusion 26 protrudes from a surface of the spherical proximal end portion 20 toward the rear of the vehicle, namely, in an operating direction as one of the shift directions of the shift lever 12. The base member 18 is formed in the shape of a rectangular parallelepiped such that an inner wall of a mounting hole (not shown) in which the bearing member 14 is fitted is recessed in one of the above-indicated shift directions. The base member 18 has a guide groove (not shown) in which the guide protrusion 26 is guided so as to permit the shift lever 12 to be operated in the shift directions and select directions. The control lever 16 functions as the rotary operating member of the invention. The control lever 16 has a columnar rotary shaft 28. The rotary shaft 28 extends to the left of the vehicle corresponding to one of directions substantially perpendicular to the protruding direction of the guide protrusion 26, i.e., one shifting direction. The rotary shaft 28 is integrally mounted on the control lever 16, at its proximal end portion to which the spherical proximal end portion 20 of the shift lever 12 is fixed such that a center line of the rotary shaft 28, namely, a rotational axis O corresponding to the rotational axis of the invention, passes the sphere center of the spherical proximal end portion 20. The control lever 16 also has a protrusion 30. A shift cable (not show) is coupled to the protrusion 30 so as to transmit the operation of the shift lever 12 in the shifting direction to the automatic transmission, when the control lever 16 is rotated about the rotational axis O in accordance with the pivotal movement of the shift lever 12 about the sphere center. The base member 18 has a pair of support walls 32 that stand so as to be opposed to each other in the lateral direction of the vehicle. A bearing hole 36 is provided in the left-side support wall 32 of the base member 18. The rotary shaft 28 of the control lever 16 located between the pair of support walls 32 is fitted in the bearing hole 36 from the inside to face the outside. A partially cylindrical bearing surface 34 is provided around the bearing hole 36, for receiving an outer circumferential surface of the rotary shaft 28 of the control lever 16.

Figure 2:
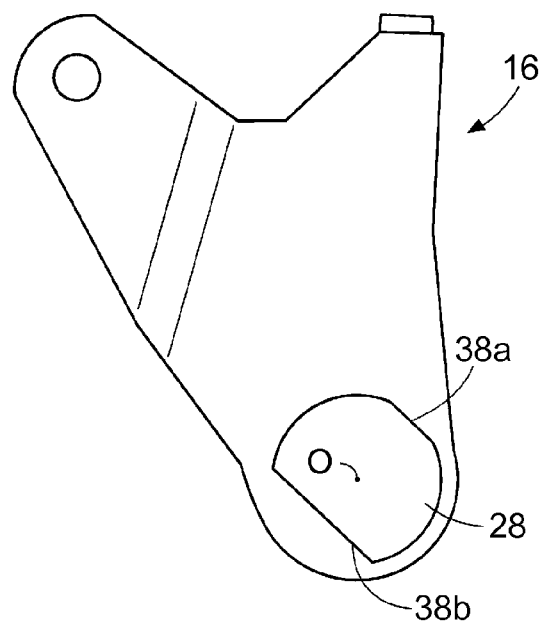
FIG. 2 is an enlarged side view showing the control lever of FIG. 1.

FIG. 2 is an enlarged side view of the control lever 16. The columnar rotary shaft 28 is formed on a lower end portion of the control lever 16 so as to protrude in the direction of the rotational axis O. A pair of flat surfaces 38a, 38b that are parallel to the center line of the rotary shaft 28, or the rotational axis O, and are parallel to each other, are formed on the outer circumferential surface of the rotary shaft 28. One of the flat surfaces 38a which is not opposed to the bearing surface 34 is smaller than the other flat surface 38b opposed to the bearing surface 34, and is formed at a position that is spaced by a larger distance from the rotational axis O than the other flat surface 38b. In other words, the other flat surface 38b is larger than the above-indicated one flat surface 38a, and is formed at a position that is spaced by a smaller distance from the rotational axis O.

Figure 3:
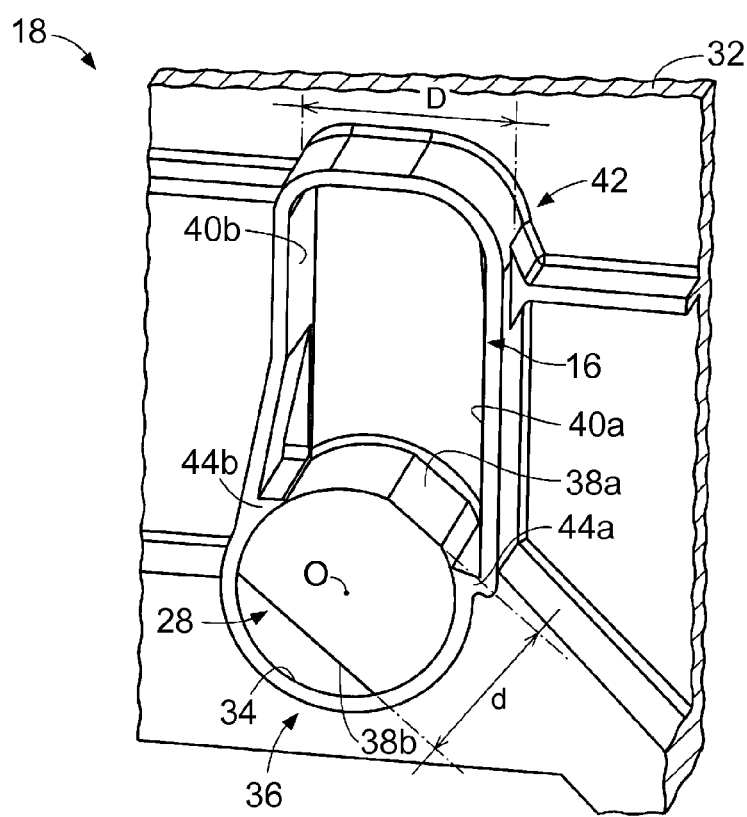
FIG. 3 is an enlarged view showing a bearing hole provided in the base member of FIG. 1 and a rotary shaft of a rotary operating member fitted in the bearing hole.
Figure 8:
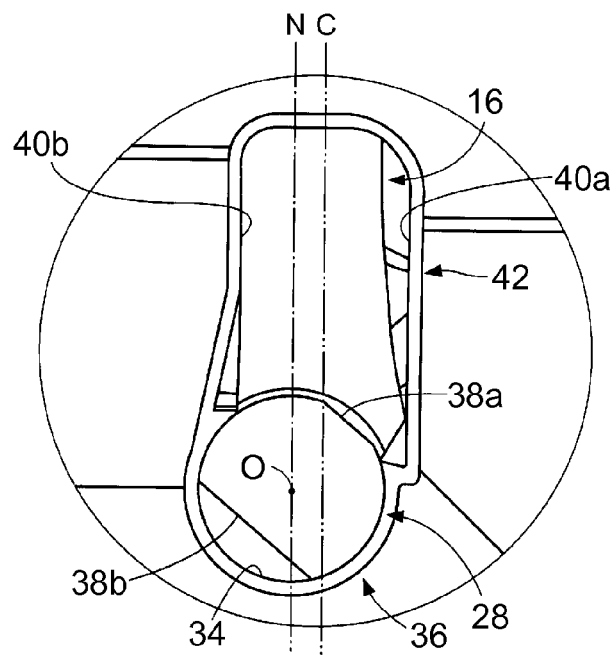
FIG. 8 is an enlarged view showing the positional relationship between the pair of flat surfaces of the rotary shaft of the control lever of FIG. 1, and the bearing surface, when the shift lever is placed in a shifting position N.

FIG. 3 is an enlarged perspective view showing the bearing hole 36 provided in the base member 18, and the rotary shaft 28 of the control lever 16 which is fitted in the bearing hole 36. FIG. 3 shows a condition in which the shift lever 12 is placed in a shifting position N (N position). The support wall 32 has an elongated guide hole 42 as an opening that is formed to extend in the vertical direction of the vehicle, to be continuous with an upper portion of the bearing hole 36 having the bearing surface 34. The base member 18 has a pair of guide walls 40a, 40b formed around the guide hole 42. The pair of guide walls 40a, 40b are continuous with the circumferentially opposite ends of the partially cylindrical bearing surface 34. The pair of guide walls 40a, 40b are opposed to each other at an interval D that is smaller than the diameter of the rotary shaft 28 and is slightly larger than the interval of the pair of flat surfaces 38a and 38b. Also, pointed protrusions 44a, 44b are formed below the pair of guide walls 40a, 40b. The pointed protrusions 44a, 44b protrude in the circumferential direction so as to approach each other, from a pair of circumferentially opposite ends of the opening of the bearing surface 34. The interval between the pair of circumferential end edges of the opening of the partially cylindrical bearing surface 34, namely, the interval between the distal ends of the pointed protrusions 44a, 44b as measured in the circumferential direction of the partially cylindrical bearing surface 34 in which the protrusions 44a, 44b protrude, is larger than the interval d between the pair of flat surfaces 38a, 38b of the rotary shaft 28. The bearing hole 36 is formed such that the inside diameter of the partially cylindrical bearing surface 34 is substantially equal to the diameter of the rotary shaft 28. Also, as shown in FIG. 8 which will be described later, the bearing hole 36 is formed such that the center of the partially cylindrical bearing surface 34 and the rotational axis O of the rotary shaft 28 are located closer to the flat surface 38b that is the larger flat surface, out of the pair of the flat surfaces 38a, 38b of the rotary shaft 28, than a center line C that is spaced by an equal distance from mutually parallel portions of the pair of guide wall 40a, 40b. Namely, the center line of the partially cylindrical bearing surface 34 is located on the vehicle front side of the center line C of the pair of guide walls 40a, 40b. Also, within a predetermined rotating angle range of the control lever 16 from the P position to the D or M position, the flat surface 38a, as the smaller one of the pair of flat surfaces 38a, 38b of the rotary shaft 28, is located between a pair of end edges as the circumferentially opposite end edges of the partially cylindrical bearing surface 34.

Figure 4:
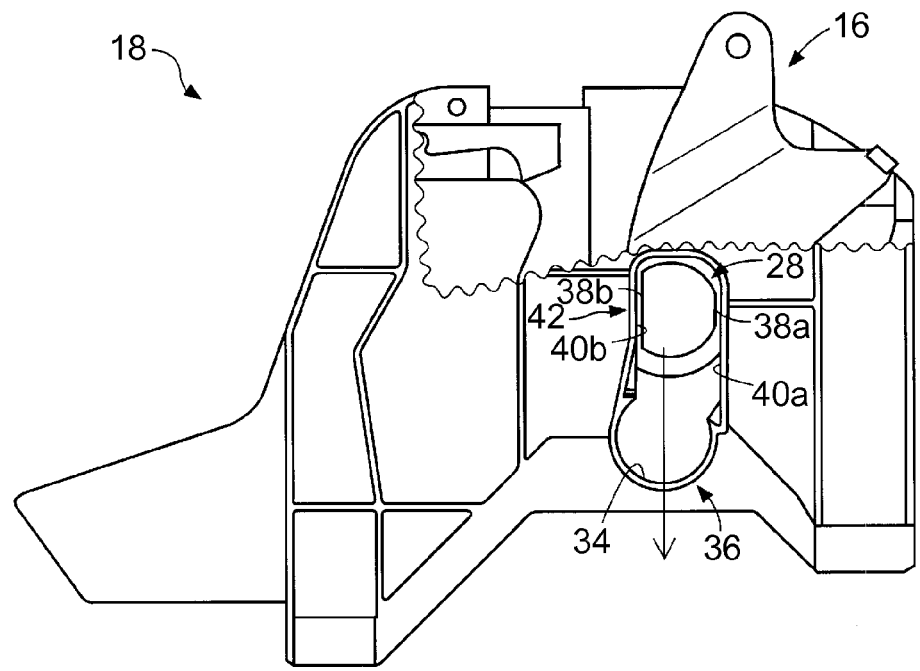
FIG. 4 is a front view showing a condition in which the rotary shaft is fitted into the guide hole when the control lever is mounted in the base member of FIG. 1.

FIG. 4 is a front view showing a condition in which the rotary shaft 28 is fitted in the guide hole 42 when the control lever 16 is mounted in the base member 18. The rotary shaft 28 is inserted into a portion of the guide hole 42 where the pair of guide walls 40a, 40b having the interval D larger than the distance d of the pair of flat surfaces 38a, 38b of the rotary shaft 28 are parallel to each other, such that the pair of flat surfaces 38a, 38b of the rotary shaft 28 slidably contact with the pair of guide walls 40a, 40b, respectively. Then, the rotary shaft 28 is moved downward in the longitudinal direction of the guide hole 42, namely, in a direction indicated by an arrow in FIG. 4. Then, the rotary shaft 28 is moved into the bearing hole 36, through the opening of the bearing surface 34.

Figure 5:
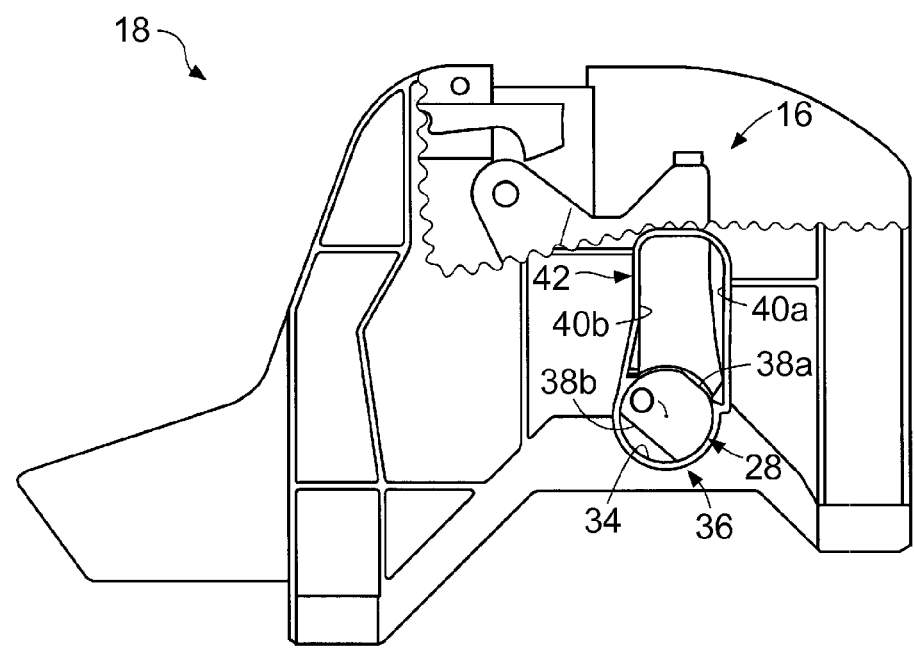
FIG. 5 is a front view showing a condition where the rotary shaft located in the bearing hole from the condition of FIG. 4 is rotated by a given angle about the rotational axis.

FIG. 5 is a front view showing a condition in which the rotary shaft 28 located in the bearing hole 36 is rotated by a given angle about the rotational axis O. Since the rotational axis O of the control lever 16 is located closer to the flat surface 38b as the larger one of the pair of flat surfaces 38a, 38b, than the center line C between the pair of guide walls 40a, 40b, the control lever 16 can rotate about the rotational axis O, immediately after the rotary shaft 28 is received by the bearing surface 34. In this condition, the diameter of the rotary shaft 28 is larger than the interval D of the pair of parallel guide walls 40a, 40b; therefore, the rotary shaft 28 is received in the bearing hole 36 without being disengaged from the hole 36 through the opening of the bearing surface 34.

Figure 6:
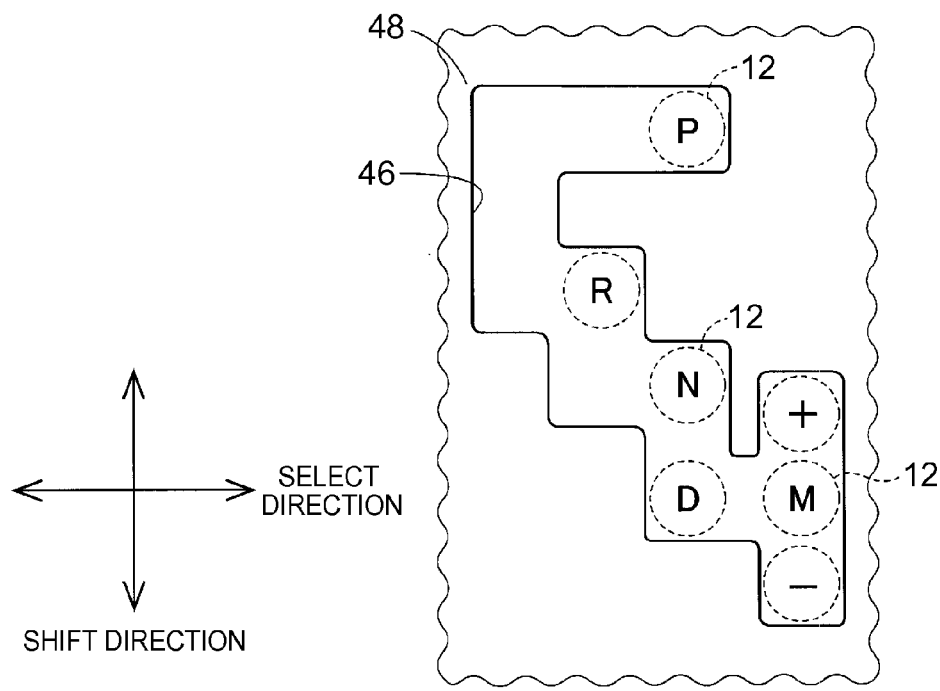
FIG. 6 is a view schematically showing a shift gate used in the vehicular shifting device of FIG. 1.

FIG. 6 schematically shows the configuration of a shift gate 48 as a plate-like member. The shift gate 48 has a guide hole 46 through which the shift lever 12 is passed, and serves to guide the shift lever 12 to a selected one of P, R, N, D, M, +, − positions. The shift gate 48 is installed in the vehicle interior so that the shift directions shown in FIG. 6 correspond to the front-back direction of the vehicle, and the shift lever 12 is erected in the vehicle interior, via the shift gate 48, such that the shift lever 12 can be operated in the shift directions and the select directions. The control lever 16 is integrally mounted to the shift lever 12, such that the rotational axis O of the rotary shaft 28 passes the sphere center of the spherical proximal end portion 20 of the shift lever 12, and is perpendicular to one shifting direction of the shift lever 12. If the shift lever 12 is operated on one of the shift directions, to be placed in one of the P, N and M positions, for example, the control lever 16 is rotated within a predetermined rotating angle range about the rotational axis O, in accordance with the operation of the shift lever 12.

Figure 7:
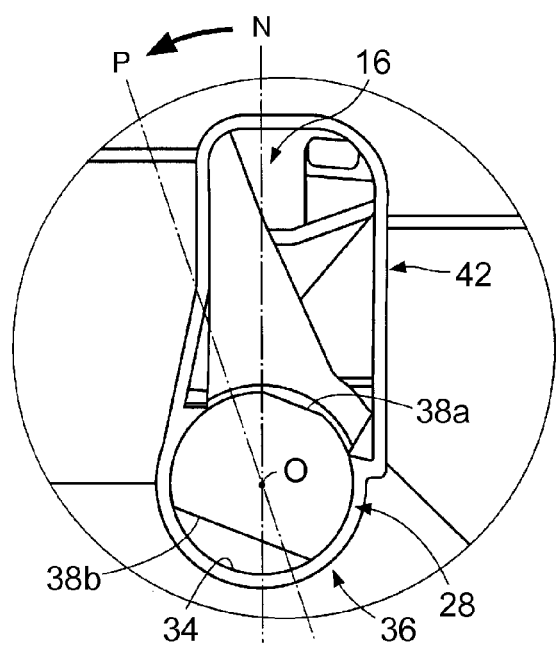
FIG. 7 is an enlarged view showing the positional relationship between a pair of flat surfaces of the rotary shaft of the control lever of FIG. 1, and the bearing surface, when the shift lever is placed in a shifting position P.
Figure 9:
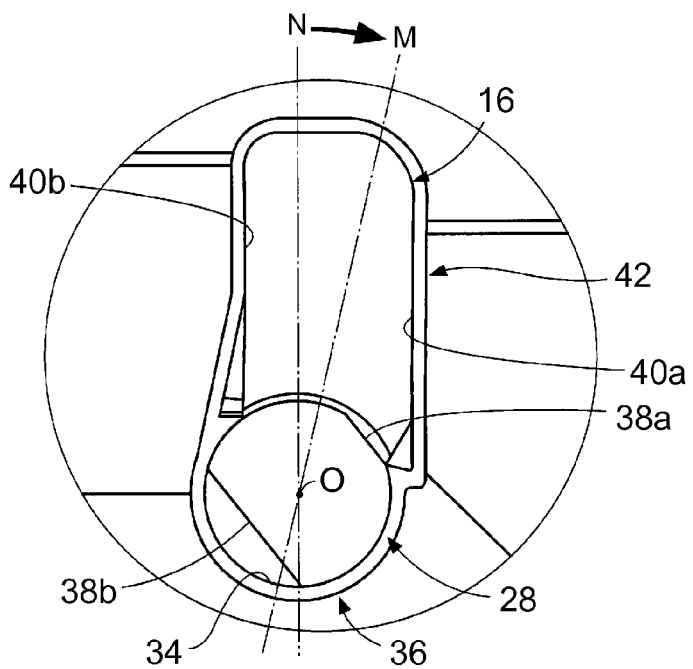
FIG. 9 is an enlarged view showing the positional relationship between the pair of flat surfaces of the rotary shaft of the control lever of FIG. 1, and the bearing surface, when the shift lever is placed in a shifting position M.
Figure 10:
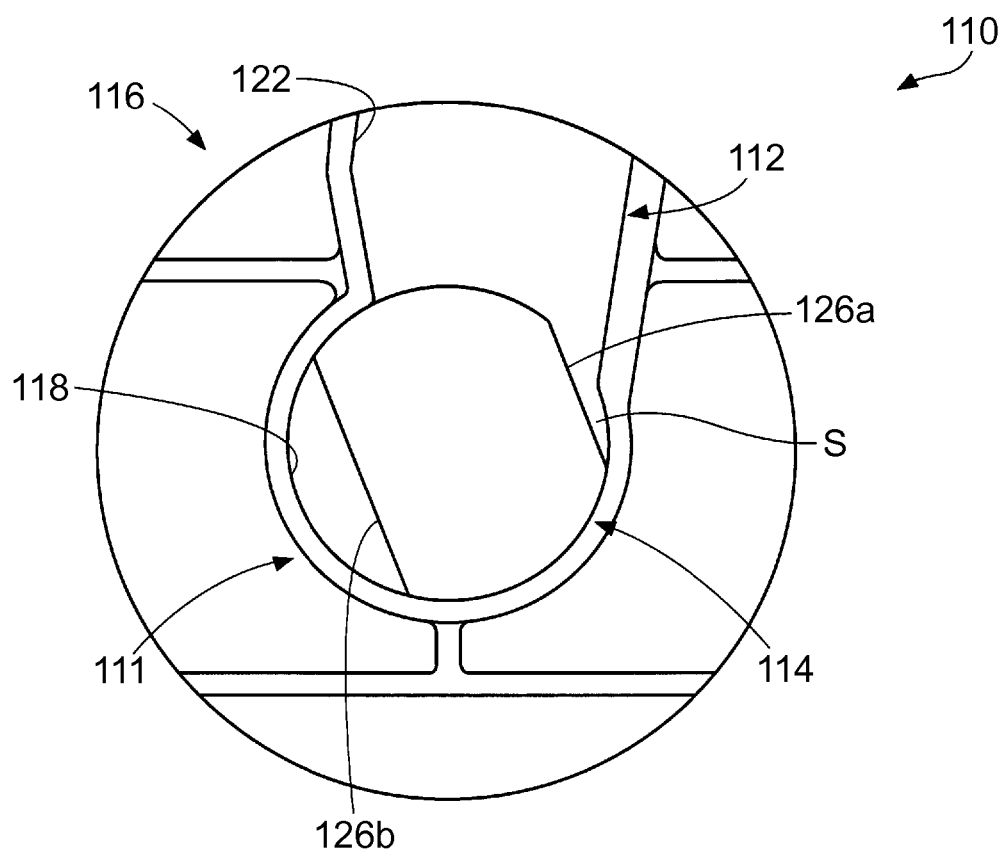
FIG. 10 is an enlarged view showing the positional relationship between a pair of flat surfaces of a rotary shaft of a rotary operating member, and a bearing surface of a bearing hole of a base member, in a shifting device for a vehicle according to the related art.

FIG. 7, FIG. 8 and FIG. 9 are enlarged views showing the positional relationships between the pair of flat surfaces 38a, 38b of the rotary shaft 28 of the control lever 16, and the bearing surface 34, when the shift lever 12 is placed in the P, N and M positions, respectively. In FIG. 7 and FIG. 9, one-dot chain lines P and M indicate that the rotary shaft 28 is rotated by a given rotating angle about the rotational axis O in each of the directions indicated by arrows, from a one-dot chain line N of FIG. 8. No matter which of the shifting position P, shifting position N and shifting position M in which the shift lever 12 is placed, the flat surface 38a as the smaller one of the pair of flat surfaces 38a, 38b of the rotary shaft 28 is located between a pair of end edges at the circumferentially opposite ends of the partially cylindrical bearing surface 34. Thus, within the rotating angle range of the control lever 16 corresponding to the shifting positions between the shifting position P and the shifting position M of the shift lever 12, the flat surface 38a as the smaller one of the pair of flat surfaces 38a, 38b of the rotary shaft 28 is located between the pair of end edges at the circumferentially opposite ends of the partially cylindrical bearing surface 34. Therefore, no clearance S is produced between a pair of opening ends of the bearing surface 34, and the flat surface 38a as one of the pair of flat surfaces 38a, 38b.

As described above, according to the vehicular shifting device 10 of this embodiment, the elongated guide hole 42 has the pair of guide walls 40a, 40b that are opposed to each other at an interval that is smaller than the diameter of the rotary shaft 28, and are continuous with the bearing surface 34. On the other hand, the rotary shaft 28 has the pair of flat surfaces 38a, 38b having a smaller interval than the interval of the pair of guide walls 40a, 40b. With the flat surfaces 38a, 38b of the rotary shaft 28 being opposed to the pair of guide walls 40a, 40b of the guide hole 42, respectively, the rotary shaft 28 is received by the bearing surface 34, so that the control lever 16 is mounted in the base member 18. In the rotating angle range of the control lever 16 corresponding to the shifting positions between the shifting position P and the shifting position M of the shift lever 12, one flat surface 38a of the pair of flat surfaces 38a, 38b is located between the pair of end edges at the circumferentially opposite ends of the partially cylindrical bearing surface 34. Therefore, no clearance S is formed between the flat surface 38a and the bearing surface 34, within the rotating angle range of the control lever 16. Thus, foreign matters are prevented from getting caught between the flat surface 38a and the bearing surface 34.

According to the vehicular shifting device 10 of this embodiment, the pair of flat surfaces 38a, 38b formed on the outer circumferential surface of the rotary shaft 28 are formed in parallel with each other, and one flat surface 38a of the pair of flat surfaces 38a, 38b is smaller than the other flat surface 38b, and is spaced from the rotational axis O by a larger distance than the other flat surface 38b. Therefore, the area of a portion of the outer circumferential surface of the rotary shaft 28 which can slide on the bearing surface 34 is increased, so that the rotating angle range of the control lever 16 in which the smaller flat surface 38a is located between the end edges at the circumferentially opposite ends of the bearing surface 34 and which correspond to the shifting positions between the shifting position P and the shifting position M of the shift lever 12 can be increased.

According to the vehicular shifting device 10 of this embodiment, the pair of guide walls 40a, 40b are formed with the pointed protrusions 44a, 44b that protrude in the circumferential direction of the bearing surface 34, from the opposite opening ends of the partially cylindrical bearing surface 34 of the bearing hole 36. Therefore, in the rotating angle range of the control lever 16 corresponding to the shifting positions between the shifting position P and the shifting position M of the shift lever 12, foreign matters deposited on the outer circumferential surface of the rotary shaft 28 which is not in sliding contact with the partially cylindrical bearing surface 34 are peeled off by means of the pointed protrusions 44a, 44b formed so as to protrude in the circumferential direction of the bearing surface 34 from the opposite opening ends of the bearing surface 34. Therefore, the foreign matters are further prevented from getting caught between the outer circumferential surface of the rotary shaft 28 and the pair of opening ends of the bearing surface 34.

According to the vehicular shifting device 10 of this embodiment, the pair of guide walls 40a, 40b opposed to each other have mutually parallel portions, and the rotational axis O is located closer to the large flat surface 38b of the pair of flat surfaces 38a, 38b than the center line C between the guide walls 40a, 40b. Since the center line of the partially cylindrical bearing surface 34 is brought into concentric relationship with the rotational axis O of the rotary shaft 28, at the same time that the rotary shaft 28 guided by the pair of guide walls 40a, 40b of the elongated guide hole 42 is received by the bearing surface 34, the rotary shaft 28 is able to rotate about the rotational axis O immediately after the shaft 28 is received by the bearing surface 34.

While one embodiment of the invention has been described in detail with reference to the drawings, the invention may be embodied in other forms, with various changes added without departing from the principle of the invention.

In the vehicular shifting device 10 of the above-described embodiment, the rotating angle range of the control lever 16 within which one flat surface 38a of the pair of flat surfaces 38a, 38b of the rotary shaft 28 is located between the end edges at the circumferentially opposite ends of the bearing surface 34 is large enough to provide the shifting positions between the shifting position P and the shifting position M of the shift lever 12, namely, permits the shift lever 12 to be operated between the shifting position P and the shifting position M. However, the invention is not limited to this arrangement. For example, the area of one flat surface 38a of the pair of flat surfaces 38a, 38b of the rotary shaft 28 may be reduced, so as to further increase the rotating angle range of the control lever 16. With the rotating angle range thus increased, the shift lever 12 may be permitted to be operated in one shifting direction to the shifting position—that is located on the rear side of the vehicle relative to the shifting position M.

In the vehicular shifting device 10 of the above-described embodiment, the pointed protrusions 44a, 44b are formed at the opposite opening ends of the partially cylindrical bearing surface 34. However, this invention is not limited to this arrangement, but a pointed protrusion may be formed at either one of the opposite opening ends of the bearing surface 34.

What is claimed is:

1. A shifting device for a vehicle, the shifting device comprising:
   a shift lever for the vehicle;
   a rotary operating member (i) connected to the shift lever, (ii) including a rotary shaft that extends in a direction of a rotational axis, the rotary shaft having a columnar shape, and (iii) being rotatable about the rotational axis within an operating angle of the shift lever; and
   a base member including a support wall having a bearing hole, a bearing surface being around the bearing hole, the bearing surface having a partially cylindrical shape, the rotary shaft being fitted in the bearing hole, and the bearing surface receiving an outer circumferential surface of the rotary shaft, wherein:
   the support wall includes a pair of guide walls that have lengths different from each other and that are opposed to each other at an interval that is smaller than a diameter of the rotary shaft,
   the guide walls are continuous with the bearing surface,
   the guide walls define an elongated guide hole,
   a pair of flat surfaces that are parallel to each other are on the outer circumferential surface of the rotary shaft,
   an interval of the pair of flat surfaces is smaller than the interval of the pair of guide walls, and one flat surface of the pair of flat surfaces is smaller than the other flat surface and is located between a pair of circumferential end edges of the bearing surface, within the operating angle of the shift lever, and a distance between the one flat surface and the rotational axis is larger than a distance between the other flat surface and the rotational axis.

2. The shifting device according to claim 1, wherein at least one of the guide walls includes a pointed protrusion that protrudes in a circumferential direction of the bearing surface, from a corresponding one of a pair of opening ends of the bearing surface.

3. The shifting device according to claim 1, wherein:

the pair of guide walls include mutually parallel portions; and the rotational axis is located closer to the other flat surface of the pair of flat surfaces than a center line between the guide walls.

4. The shifting device according to claim 1, wherein the entire one flat surface of the pair of flat surfaces is located between the pair of circumferential end edges of the bearing surface.

5. The shifting device according to claim 1, wherein the length of the one flat surface of the pair of flat surfaces is less than the interval of the pair of guide walls.

6. The shifting device according to claim 1, wherein the one flat surface of the pair of flat surfaces and the other flat surface are opposed to each other and are on opposite sides of the rotational axis.

7. The shifting device according to claim 1, wherein the one flat surface of the pair of flat surfaces and the other flat surface are each intersected by a single plane that is perpendicular to the rotational axis.

8. The shifting device according to claim 1, wherein the guide walls and the bearing surface constitute part of a closed perimeter that is formed by the support wall and that surrounds the bearing hole and the elongated guide hole.

* * * * *